United States Patent [19]

Rye

[11] Patent Number: 4,663,498

[45] Date of Patent: May 5, 1987

[54] ROD ANCHORED TO A TUBULAR SLEEVE BODY

[75] Inventor: Kjell Rye, Sjetnhaugan, Norway

[73] Assignee: Hoiness & Hoiness A/S, Oslo, Norway

[21] Appl. No.: 771,690

[22] Filed: Sep. 3, 1985

[30] Foreign Application Priority Data

Aug. 31, 1984 [NO] Norway ................................ 843462

[51] Int. Cl.[4] ........................ H01B 17/38; F16B 11/00

[52] U.S. Cl. .................................... 174/189; 174/176; 174/186; 174/192; 403/268

[58] Field of Search .................... 174/140 S, 176, 177, 174/178, 179, 186, 188, 189, 191, 192, 196, 197, 198, 199; 403/265, 266, 267, 268

[56] References Cited

U.S. PATENT DOCUMENTS

| | | | |
|---|---|---|---|
| 974,177 | 11/1910 | Noeggerath | 174/192 X |
| 4,057,687 | 11/1977 | Willem | 174/186 X |
| 4,127,741 | 11/1978 | Bauer et al. | 174/189 |
| 4,435,615 | 3/1984 | Kaczerginski et al. | 174/189 |

FOREIGN PATENT DOCUMENTS

| | | | |
|---|---|---|---|
| 239887 | 4/1965 | Austria | 174/176 |
| 0125421 | 11/1984 | European Pat. Off. | 174/179 |
| 2128412 | 1/1973 | Fed. Rep. of Germany | 174/176 |
| 2611504 | 9/1977 | Fed. Rep. of Germany | 174/192 |
| 203425 | 10/1983 | Fed. Rep. of Germany | 174/176 |
| 7737 | 11/1919 | Finland | 174/192 |
| 2345796 | 10/1977 | France . | |
| 576690 | 6/1976 | Switzerland | 174/179 |
| 1408861 | 10/1975 | United Kingdom | 174/177 |

*Primary Examiner*—Laramie E. Askin

*Attorney, Agent, or Firm*—Browdy and Neimark

[57] ABSTRACT

Assembly composed of a rod (6) and a tubular sleeve body (1), such as a terminal holder for a rod-shaped insulator core, wherein one end of the rod (6) is inserted into and retained in the interior of the sleeve. The interior of the sleeve (1) comprises a guide portion (9) of a diameter essentially corresponding to the diameter of the rod (6), and a widened portion (12) arranged inside of the guide portion (9). The end portion of the rod (6) is formed with a portion (7) of reduced diameter and a portion (8) widened therefrom towards the end of the rod. A plurality of locking bodies in the form of spheres (21) are disposed in the annular space (23) formed between the widened portion (12) of the sleeve body (1) and the rod portion (7) of reduced diameter, and in a locking position these spheres bear against the inner wall of the sleeve and the outer wall of the rod (6), these spheres being kept in place by a hardened binding agent (22) filling said annular space (23).

19 Claims, 9 Drawing Figures

ROD ANCHORED TO A TUBULAR SLEEVE BODY

The present invention relates to an assembly composed of a rod and a tubular sleeve body open at one end thereof, such as a terminal holder for a rod-shaped insulator core, wherein one end of the rod is inserted into the interior of the sleeve and is secured against extraction by means of a hardenable binding agent filling the space between the sleeve and the rod.

Such assemblies are particularly used in connection with rod-shaped insulator cores and as stays for masts and poles, for example for electricity lines. Examples of such assemblies are described in U.S. Pat. No. 4,057,687 and in published French Specification No. 2,345,796.

In the assembly according to U.S. Pat. No. 4,057,687 there exists a difficulty with respect to a wedge-shaped element embedded between a sleeve and a rod inserted into the sleeve. The wedge-shaped element is formed after the rod has been inserted into the sleeve in that a hardenable material, such as a resin, has been filled into the space between the sleeve and the rod for hardening. This method is more difficult to control with respect to possible voids or air bubbles enabling quality variations of electrical as well as mechanical nature.

The assembly according to FR published patent specification No. 2,345,796 is based on a wedge-shaped element cast firmly onto the end of a rod. If the rod is manufactured from fibers embedded in a resin, the wedge-shaped element can be cast directly to the rod with a resin. It is presupposed that the wedge-shaped element is cast firmly to the rod before the resin in the rod has polymerized completely. This method for casting-on the wedge-shaped element implies that it is difficult to control the quality of the joint between the wedge-shaped element and the rod. In case of extreme radial and axial loads, as a function of a combination of temperature variations and load forces, the rod may loosen from the wedge-shaped element.

A problem in connection with such assemblies is that existing epoxy masses have a tendency to become pliable, especially at relatively high temperatures (70°–100° C.), so that the connection between the sleeve and the rod is not sufficiently stable and secure.

The object of the invention is to provide an assembly which eliminates the drawbacks of the known assemblies and which provides a very stable and secure anchoring by a combination of a mechanical locking system and embedding.

The above-mentioned object is achieved by an assembly of the introductorily stated type which, according to the envention, is characterized in that the interior of the sleeve comprises a guide portion of a diameter essentially corresponding to the diameter of the rod, and a widened portion arranged inside of the guide portion, and that the end portion of the rod is formed with a portion of reduced diameter and a portion widened therefrom towards the end of the rod, a holding means in the form of a plurality of locking bodies being disposed in the annular space formed between the widened portion of the sleeve body and the rod portion of reduced diameter, and in a locking position bearing against the inner wall of the sleeve and the surface of the rod, the locking bodies being kept in place in the locking position by means of the binding agent.

The invention will be further described below in connection with a number of exemplary embodiments with reference to the accompanying drawings, wherein similar parts are designated by the same reference numeral in the various Figures, and wherein FIG. 1 shows as axial section through a sleeve body and illustrates various portions of the interior of the sleeve body;

Figure 1:
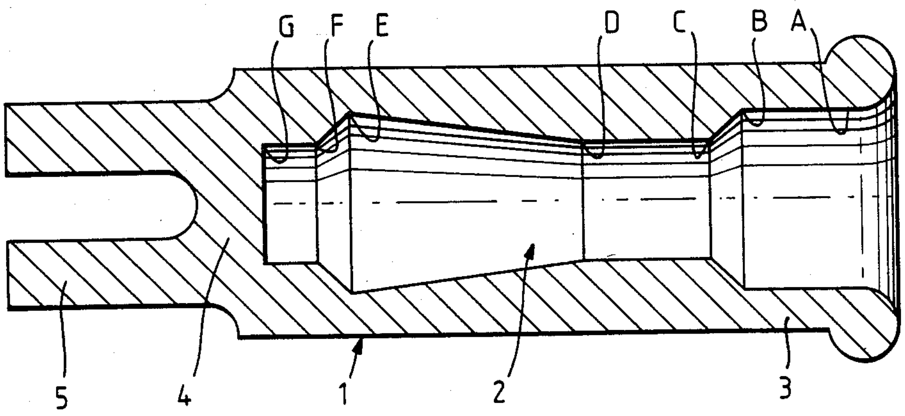

In FIG. 1 there is shown a tubular sleeve body 1 having an interior cavity 2 which is open towards one end 3 constituting the lead-in end of a rod which is to be anchored or secured in the sleeve. In the illustrated embodiment, the sleeve body has a closed bottom portion 4, but the interior cavity may possibly be throughgoing, as for example a sealing cap may be inserted to abutment against the rod end. The sleeve body is shown to have a fork-shaped end portion 5 which may constitute a fork holder, for instance when the sleeve forms part of a terminal mount or terminal holder for a rod-shaped insulator core. It will be clear that this end of the sleeve, which is preferably made of steel, may have various configurations, according to the actual use. For example, it may have a threaded end, with the possibility of screwing-in different connection pieces, e.g. an eyelet, a ball hook, a fork holder or the like.

As shown, the interior of the sleeve body 1 is formed with a number of different portions, more specifically a lead-in portion A–B, an inwards converging, rounded transition portion B–C, an essentially cylindrical guide portion C–D for the rod to be anchored in the sleeve, a widened portion in the form of an inwards diverging, conical locking portion D–E, an inwards converging, transition portion E–F, and finally a rearward guide portion F–G.

Figure 2:
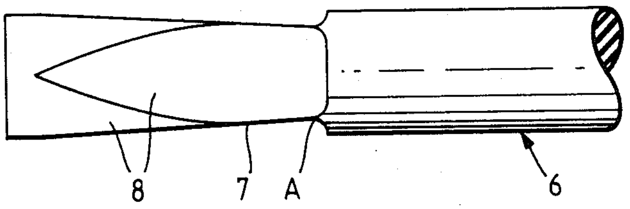
FIG. 2 shows a view of an embodiment of a rod according to the invention.
Figure 9:
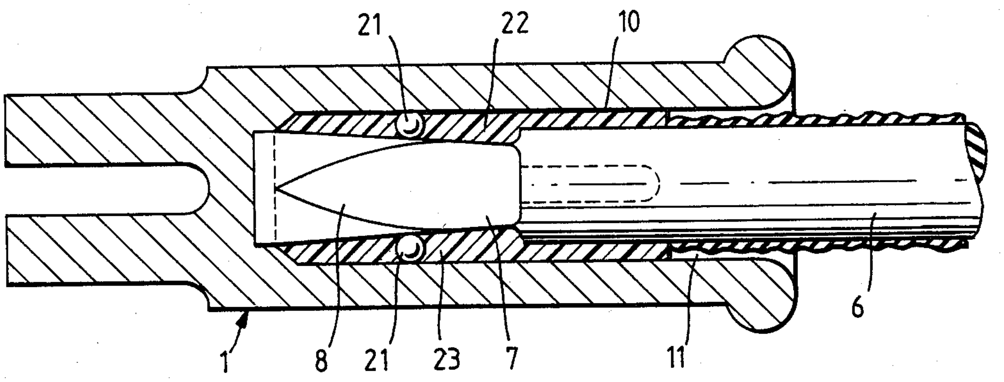
FIG. 9 shows an axial section of an assembled rod and sleeve embodiment according to FIG. 3 and FIG. 4, respectively.

In FIG. 2 there is shown a part of a rod 6 which is designed for anchoring or fixing in the sleeve 1 according to FIG. 1. As shown, the end portion of the rod 6 is formed with a portion 7 of reduced diameter and a portion widened therefrom towards the end of the rod and which, in the illustrated embodiment, is constituted by four faceted, essentially planar surfaces 8 having mutually diverging courses in the direction towards the end of the rod. The number of faceted surfaces may vary dependent on the diameter point A in FIG. 2 will vary dependent on the diameter of the rod, and will be adapted to the size of the locking bodies, and more specifically to the diameter of the locking bodies when these are in the form of balls or spheres as shown in FIG. 9. For example, the rod 6 may consist of glass fiber, especially in the case of an insulator core for a terminal holder.

Preferably, the locking bodies are spheres of an insulating material, such as glass or ceramics, and to ensure a correct introduction and placing of the respective spheres in the interior of the sleeve, the sleeve body is provided with a special locking sphere groove system. This may be differently shaped with respect to the running track of the locking spheres, and the number of lead-in grooves may vary. The grooves are adapted to the dimension of the locking spheres and may vary dependent on or in relation to the diameter of the rod.

Figure 3:
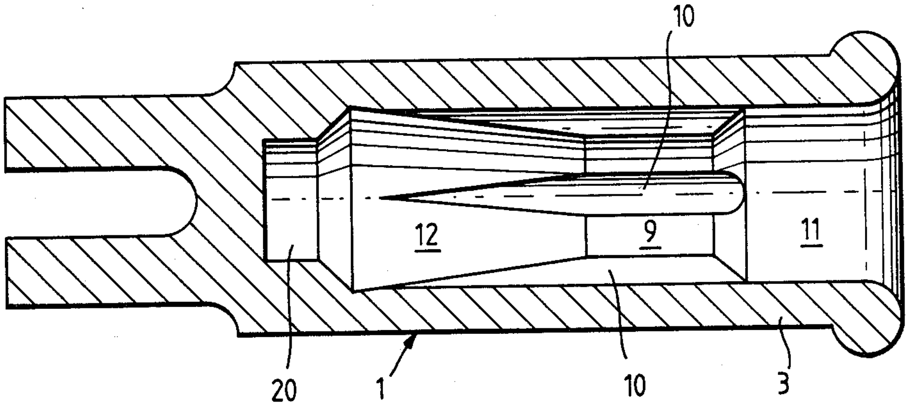
FIG. 3 shows an axial section of a first embodiment of a sleeve according to the invention.

In FIG. 3 there is shown a sleeve embodiment wherein the guide portion 9 of the sleeve body 1 is provided with four locking sphere lead-in grooves 10 extending parallel to the axis of the sleeve body, the grooves extending from the widened lead-in portion 11 of the sleeve body and opening into the widened and in the shown case conically diverging portion 12 of the sleeve body.

Figure 4:
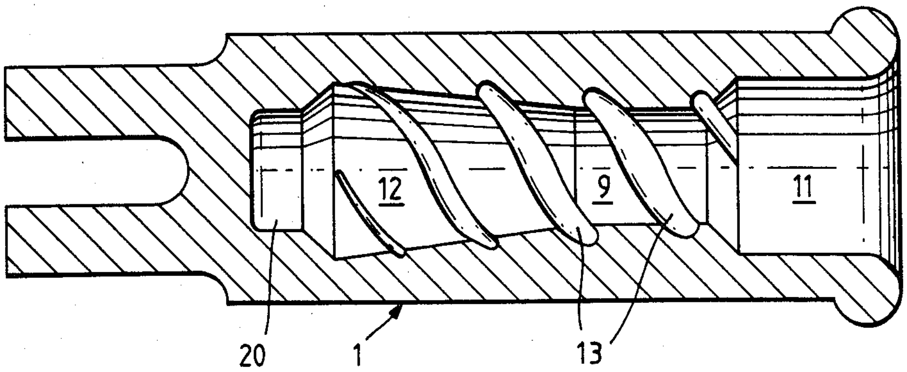
FIGS. 4–8 show axial sections of second, third, fourth, fifth and sixth sleeve embodiments, respectively.

FIG. 4 shows another sleeve embodiment with helical lead-in grooves 13 from the lead-in portion 11 of the sleeve to the mouth of the conically widened portion 12.

Figure 5:
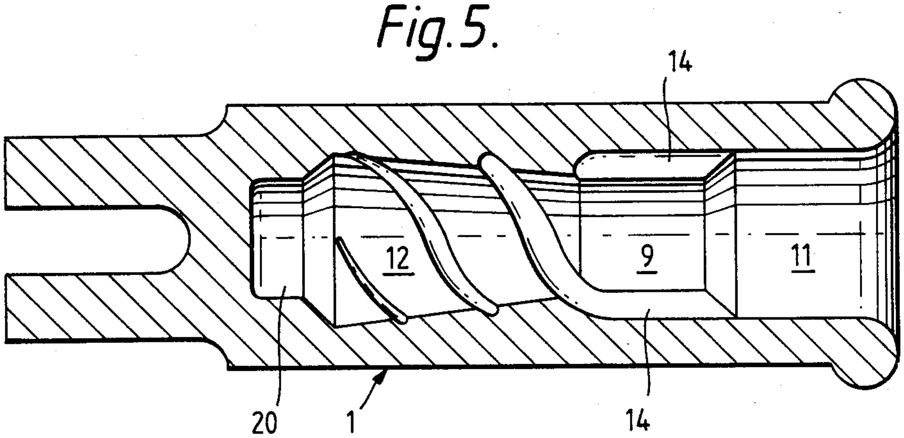

FIG. 5 shows a third sleeve embodiment with lead-in grooves 14 extending parallel to the axis in the guide portion 9 of the sleeve, but therefrom having a helical shape ahead to the mouth of the conically widened sleeve portion 12.

Figure 6:
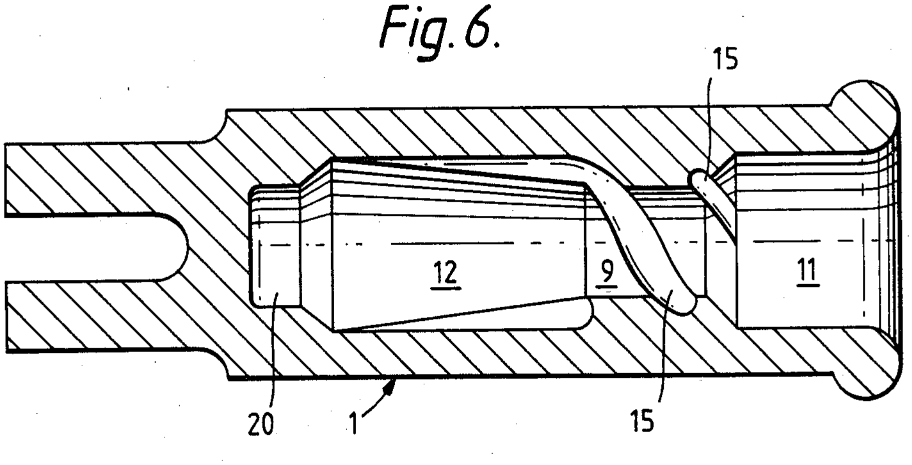

FIG. 6 shows a fourth sleeve embodiment with lead-in grooves 15 having a helical course in the guide portion 9, but therefrom extending parallel to the axis to the mouth of the conically widened sleeve portion 12.

Figure 7:
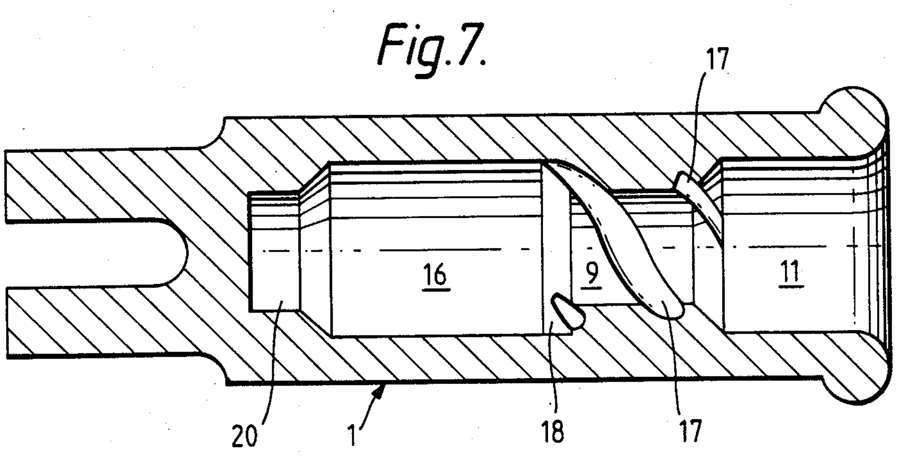

FIG. 7 shows fifth sleeve embodiment wherein the sleeve body 1 has a widened portion 16 which is cylindrical, in contrast to the conically widened portion 12 in the embodiments according to FIGS. 3–6. This embodiment is provided with lead-in grooves 17 having a helical course in the guide portion 9 of the sleeve and opening in the widened, cylindrical portion 16 in a diverging transition portion 18, so that the cylindrical portion is without any sphere guide grooves.

Figure 8:
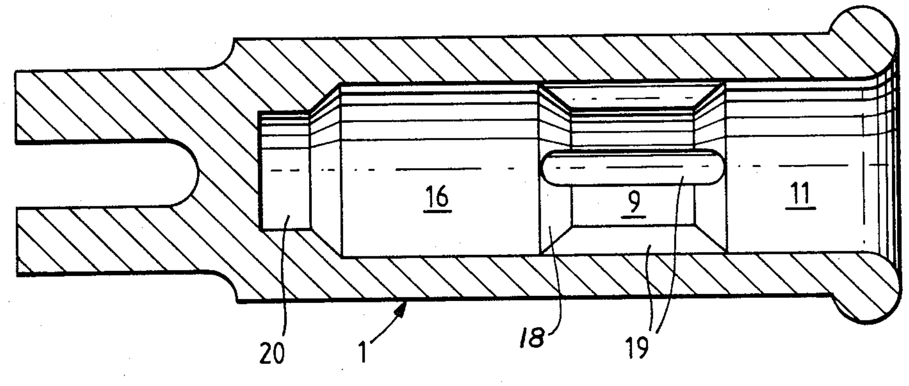

FIG. 8 shows a sixth sleeve embodiment corresponding to the embodiment in FIG. 7 apart from the fact that it is provided with lead-in grooves 19 extending parallel to the axis in the guide portion 9 of the sleeve.

As appears from the drawings, the interior cavity 2 of the sleeve body 1 in all the illustrated embodiments terminates in a bottom portion 4 having a hole 20 for guiding receipt of the end of the rod 6, the diameter of the hole 20 corresponding to the diameter of the rod end. Further, the lead-in portion 11 of the sleeve body has a cylindrical shape, with a radius which is somewhat larger than the sum of the radius of the rod 6 and the diameter of the locking spheres shown in FIG. 9.

FIG. 9 shows a finished assembly comprising the sleeve embodiment in FIG. 3 (having four sphere guide grooves 10) and the rod embodiment in FIG. 4. The rod 6, which in the illustrated case may be an insulating glass fiber rod, is faceted according to a special grinding procedure, and the facet surfaces 8 are adapted to the radius of the locking spheres 21, so that the sum of the greatest depth of the facet surfaces (point A in FIG. 2) from the surface of the rod and the depth of the lead-in portion 11 of the sleeve 1 from the guide portion 9 is equal to or somewhat larger than the diameter of the locking spheres. The binding agent 22 used is of a resin type, e.g. a two-component epoxy mass, which is adapted to the glass fiber rod and the metal type of the sleeve body.

When assembling the device, resin in added to the tubular sleeve 1 and the rod 6 is placed vertically in the sleeve and inserted with its end in the centering hole 20 in the bottom of the sleeve. As the diameter of the guide portion 9 of the sleeve corresponds to the diameter of the rod, the rod is stably centered in the sleeve. Thereafter, the locking spheres 21 are introduced into their respective lead-in grooves 10, so that the spheres arrive at abutment against the facet surfaces of the rod. In the illustrated case, these spheres are glass spheres of a special quality. The rod is moved with the locking spheres in the tubular sleeve, and when the rod is established in correct position in the sleeve, this is vibrated for fixing of the locking spheres in correct position, i.e. in a blocking position in relation to the lead-in grooves. Thus, in this position the locking spheres 21 rest against the facet surfaces 8 of the rod and against the inner wall of the widened portion 12 (or 16, 18 in the embodiments according to FIGS. 7 and 8) of the sleeve 1, and the spheres are effectively kept in place by the binding agent 22 filling the annular space 23 formed between the widened portion of the sleeve body and the facet surfaces of the rod.

I claim:

1. An assembly composed of a rod (6) and a tubular sleeve body (1) open at a lead-in end thereof, such as a terminal holder for a rod-shaped insulator core, wherein one end of the rod (6) is inserted into the interior of the sleeve body (1) and is secured against extraction by means of a hardenable binding agent (22) filling the space between the sleeve body and the rod, wherein
   - the interior of the sleeve body (1) comprises a guide portion (9) of a diameter essentially corresponding to the diameter of the rod (6), and a widened portion (12;16) arranged inside of the guide portion, and
   - the end portion of the rod (6) is formed with a portion (7) of reduced diameter and a portion (8) widened therefrom towards the end of the rod, a holding means in the form of a plurality of locking bodies (21) being disposed in the annular space (23) formed between the widened portion (12;16) of the sleeve body (1) and the rod portion (7) of reduced diameter, and in a locking position bearing against the inner wall of the sleeve body (1) and the surface of the rod (6), the locking bodies (21) being kept in place in the locking position by means of the binding agent (22), and
   - the rod, in the portion of reduced diameter being faceted so that it has a number of essentially planar surfaces having a mutually diverging course in the direction toward the end of the rod.

2. An assembly according to claim 1, CHARACTERIZED IN THAT the locking bodies consist of spheres (21).

3. An assembly according to claim 2, CHARACTERIZED IN THAT the lead-in end (3) of the sleeve body (1) has a widened, cylindrical end portion (11) of a radius which is somewhat larger than the sum of the radius of the rod (6) and the sphere diameter.

4. An assembly according to claim 1, CHARACTERIZED IN THAT the guide portion (9) of the sleeve body (1) is provided with a number of lead-in grooves (10;13;14;15;17;19) for a corresponding number of locking bodies (21), which lead-in grooves extend from the lead-in end (3) of the sleeve body (1) and open into the widened portion (12;16) of the sleeve body (1).

5. An assembly according to claim 4, CHARACTERIZED IN THAT the lead-in grooves (10;19) extend essentially parallel to the axis of the sleeve body (1).

6. An assembly according to claim 4, CHARACTERIZED IN THAT the lead-in grooves (13;14;15;17) have a helical course at least along a part of their axial extension along the sleeve body (1).

7. An assembly according to claim 1, CHARACTERIZED IN THAT the widened portion (12) of the sleeve body (1) is conically diverging in the direction away from the guide portion (9).

8. An assembly according to claim 1, CHARACTERIZED IN THAT the widened portion (16) of the sleeve body (1) is cylindrical.

9. An assembly according to claim 1, CHARACTERIZED IN THAT the interior (2) of the sleeve body (1) ends in a bottom portion (4) having a hole (20) for guiding receipt of the end of the rod (6).

10. An assembly composed of a rod and a tubular sleeve body, such as a terminal holder for a rod-shaped insulator core, wherein the sleeve body has a lead-in end, and the interior of the sleeve body comprises a guide portion of a diameter essentially corresponding to the diameter of the rod, and a widened portion arranged inside of the guide portion, one end of the rod being inserted into the interior of the sleeve body and being secured against extraction by means of a hardenable binding agent filling the spaced between the sleeve body and the rod, the end of the rod being formed with a number of axially extending portions recessed in relation to the surface of the rod, and holding elements being placed between the sleeve body and the corresponding recessed portions and being kept in place by means of the binding agent, CHARACTERIZED IN THAT the recessed portions of the rod are constituted by a peripheral portion of reduced diameter and a portion widened therefrom towards the end of the rod, and that the holding elements are in the form of locking bodies which are disposed in the annular spaced between the widened portions of the sleeve body and the rod and in a locking position bear against the inner wall of the sleeve body and the surface of the rod.

11. An assembly according to claim 10, CHARACTERIZED IN THAT the locking bodies consist of spheres.

12. An assembly according to claim 11, CHARACTERIZED IN THAT the lead-in end of the sleeve body has a widened, cylindrical end portion of a radius which is somewhat larger that the sum of the radius of the rod and the diameter of the spheres.

13. An assembly according to claim 10, CHARACTERIZED IN THAT the guide portion of the sleeve body is provided with a number of lead-in grooves for a corresponding number of locking bodies, which lead-in grooves extend from the lead-in end of the sleeve body.

14. An assembly according to claim 13, CHARACTERIZED IN THAT the lead-in grooves extend essentially parallel to the axis of the sleeve body.

15. An assembly according to claim 13, CHARACTERIZED IN THAT the lead-in grooves have a helical course at least along a part of their axial extension along the sleeve body.

16. An assembly according to claim 10, CHARACTERIZED IN THAT the rod in the portion of reduced diameter is faceted so that it has a number of essentially planar surfaces having a mutually diverging course in the direction towards the end of the rod.

17. An assembly according to claim 10, CHARACTERIZED IN THAT the widened portion of the sleeve body is conically diverging in the direction away from the guide portion.

18. An assembly according to claim 10, CHARACTERIZED IN THAT the widened portion of the sleeve body is cylindrical.

19. An assembly according to claim 10, CHARACTERIZED IN THAT the interior of the sleeve body ends in a bottom portion having a hole for guiding receipt of the end of the rod.

* * * * *

UNITED STATES PATENT AND TRADEMARK OFFICE

CERTIFICATE OF CORRECTION

PATENT NO. : 4,663,498

DATED : May 5, 1987

INVENTOR(S) : Kjell Rye

It is certified that error appears in the above-identified patent and that said Letters Patent is hereby corrected as shown below:

Col. 2, line 51: insert after "diameter" insert --of the rod. The depth of the reduced portion 7 at the--.

Col. 3, line 22: after "shows" insert --a--.

Signed and Sealed this

Tenth Day of November, 1987

*Attest:*

DONALD J. QUIGG

*Attesting Officer* *Commissioner of Patents and Trademarks*